(12) United States Patent
Tajima et al.

(10) Patent No.: US 8,428,613 B2
(45) Date of Patent: Apr. 23, 2013

(54) WIRELESS COMMUNICATION SYSTEM, BASE STATION DEVICE AND MOBILE STATION DEVICE

(75) Inventors: Yoshiharu Tajima, Kawasaki (JP);
Kazuo Kawabata, Kawasaki (JP);
Yoshiaki Ohta, Kawasaki (JP);
Kazuhisa Obuchi, Kawasaki (JP);
Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 701 days.

(21) Appl. No.: 12/355,024

(22) Filed: Jan. 16, 2009

(65) Prior Publication Data
US 2009/0131070 A1 May 21, 2009

Related U.S. Application Data

(63) Continuation of application No. PCT/JP2006/314866, filed on Jul. 27, 2006.

(51) Int. Cl.
*H04W 74/00* (2009.01)
(52) U.S. Cl.
USPC ........ 455/455; 455/452.2; 455/450; 455/447; 455/453; 455/509; 455/166.2
(58) Field of Classification Search .................. 455/455, 455/452.2, 450, 447, 453, 509, 166.2
See application file for complete search history.

(56) References Cited

U.S. PATENT DOCUMENTS

| | | | | |
|---|---|---|---|---|
| 6,072,988 A * | 6/2000 | Minegishi | ....................... | 455/62 |
| 2002/0119781 A1 | 8/2002 | Li et al. | | |
| 2002/0147017 A1 | 10/2002 | Li et al. | | |
| 2003/0013454 A1* | 1/2003 | Hunzinger | .................... | 455/452 |
| 2003/0169681 A1 | 9/2003 | Li et al. | | |

(Continued)

FOREIGN PATENT DOCUMENTS

| | | |
|---|---|---|
| EP | 1 509 056 | 2/2005 |
| EP | 1 638 359 | 3/2006 |

(Continued)

OTHER PUBLICATIONS

Huawei; "Inter-cell Interference Mitigation" 3GPP TSG RAN WG1 Ad Hoc on LTE, Sophia Antipolis, France, Jun. 20-21, 2005; R1-050629; [Ref.: EESR mailed Jun. 7, 2011].

Samsung, "Flexible Fractional Frequency Reuse Appro", 3rd Generation Partnership Project TSG-RAN WG1, R1-051341, 8.2, Nov. 2005.

International Search Report for corresponding International Application No. PCT/JP2006/314866, date of completion of search Oct. 17, 2006.

English Translation of International Preliminary Report on Patentability and Written Opinion of PCT/JP2006/314866, issued Jan. 27, 2009.

Japanese Patent Office "Notice of Reason for Rejection" issued for Japanese Patent Application No. 2008-526641, mailed Feb. 22, 2011. English translation attached.

(Continued)

*Primary Examiner* — Wayne Cai
*Assistant Examiner* — Shantell L Heiber
(74) *Attorney, Agent, or Firm* — Myers Wolin, LLC

(57) ABSTRACT

A wireless communication system comprises a mobile station and a base station, which use a plurality of communication channels and a pilot channel corresponding to at least one of the communication channels. The base station has a transmitting unit that employs at least one of the communication channels as a priority channel and transmits channel information of this priority channel and the other channels by use of a communication channel other than the pilot channel. The mobile station has a determining unit that determines a reception level of the pilot channel; an acquiring unit that acquires the channel information transmitted via the communication channel other than the pilot channel; and a deciding unit that decides, as an available communication channel, at least one of the communication channels based on both the channel information acquired by the acquiring unit and the reception level determined by the determining unit.

9 Claims, 7 Drawing Sheets

U.S. PATENT DOCUMENTS

| | | | |
|---|---|---|---|
| 2003/0220112 A1 | 11/2003 | Bugeja | |
| 2004/0190486 A1* | 9/2004 | Oshiba | 370/349 |
| 2005/0090278 A1 | 4/2005 | Jeong et al. | |
| 2006/0058047 A1 | 3/2006 | Jeong et al. | |
| 2006/0083210 A1 | 4/2006 | Li et al. | |
| 2007/0010269 A1* | 1/2007 | Azuma | 455/512 |
| 2007/0054626 A1 | 3/2007 | Li et al. | |
| 2008/0219363 A1 | 9/2008 | Li et al. | |
| 2009/0168912 A1 | 7/2009 | Li et al. | |

FOREIGN PATENT DOCUMENTS

| | | |
|---|---|---|
| JP | 03-273719 | 12/1991 |
| JP | 07-038953 | 2/1995 |
| JP | 07-038953 | 7/1995 |
| JP | 10-210542 | 8/1998 |
| WO | 00/38457 | 6/2000 |
| WO | 02/49305 | 6/2002 |

OTHER PUBLICATIONS

Extended European Search Report with Annex and written opinion issued for corresponding European Patent Application No. 06781777.5, mailed Jun. 7, 2011.

Technical Specification Group Radio Access Network, "Requirements for Evolved UTRA(E-UTRA) and Evolved UTRAN(E-UTRAN)(Release 7)", 3rd Generation Partnership Project, 3GPP TR 25.913 V7.2.0, Dec. 2005.

* cited by examiner

WIRELESS COMMUNICATION SYSTEM, BASE STATION DEVICE AND MOBILE STATION DEVICE

CROSS-REFERENCE TO RELATED APPLICATIONS

This is a continuation of Application PCT/JP2006/314866, filed on Jul. 27, 2006, now pending, the contents of which are herein wholly incorporated by reference.

FIELD

The present invention relates to a wireless communication system which executes channel allocation control, a base station device and a mobile station device.

BACKGROUND

In a mobile communication system, a third generation mobile phone system utilizing a CDMA (Code Division Multiple Access) system is currently put to practical use and a study of a next generation mobile communication system enabling faster communications to be performed has been recently studied (refer to Non-Patent document 1 given below). As to the next generation mobile communication system, an application of an OFDM (Orthogonal Frequency Division Multiplexing) system is examined in place of the CDMA system. The OFDM system is a technique of segmenting transmission data into plural pieces of transmission data, then mapping the segmented pieces of transmission data to a plurality of orthogonal carrier waves (subcarriers) and transmitting the data in parallel on a frequency-axis.

In the mobile communication system utilizing this type of OFDM system, the base stations neighboring to each other need allocating frequency bands different from each other. This is because if the neighboring base stations perform the wireless communications in a way that uses the same frequency band, mutual interference might be caused. It is, however, desirable for increasing the frequency utilization efficiency to enable, if practicable, the same frequency band to be used in the respective base stations.

In this respect, there is proposed a method of making a frequency repetitive distance variable corresponding to a distance of the mobile station from the base station (refer to Non-Patent document 2 given below). The frequency repetitive distance connotes a necessary distance (cell count) when considering an arrangement of the base stations (cells) in which the neighboring base stations do not use the same frequency band. According to this system, the interference with the neighboring base station is prevented by increasing the frequency repetitive distance (the frequency repetitive distance is set to, e.g., "3") if the mobile station exists in a position remote from the base station, and the frequency utilization efficiency is improved by decreasing the frequency repetitive distance (the frequency repetitive distance is set to, e.g., "1", i.e., all of the frequency channels can be used) if in a position close to the base station.

Non-Patent document 1: Technical Specification Group Radio Access Network, "Requirements for Evolved UTRA (E-UTRA) and Evolved UTRAN (E-UTRAN) (Release 7)", 3rd Generation Partnership Project, 3GPP TR 25.913 V7.2.0, December 2005

Non-Patent document 2: Samsung, "Flexible Fractional Frequency Reuse Appro", 3rd Generation Partnership Project TSG-RAN WG1, R1-051341, 8.2, November 2005

SUMMARY

There is not, however, proposed a specific technique for applying the frequency repetitive distance variable method to the mobile communication system, from which a problem arises.

It is an object of the present invention to provide a wireless communication system, a mobile station device and a base station device, which actualize fast mobile communications while scheming to improve the frequency utilization efficiency.

The present invention adopts the following configurations in order to solve the problems given above. Namely, the present invention is a base station device performing wireless communications with a mobile station by use of a plurality of communication channels and a pilot channel corresponding to at least one of the plurality of communication channels, the base station device comprising: a transmitting unit setting at least one of the plurality of communication channels as a priority channel and transmitting channel information on the priority channel and the other channels by use of the communication channel other than the pilot channel.

With this configuration, the mobile station receiving the channel information transmitted from the base station device can acquire information on the priority channel in the plurality of received communication channels and information on the other channels from the channel information. Further, the transmitting unit may, with respect to the channel information, use, e.g., a broadcast channel as the communication channel other than the pilot channel.

Further, the transmitting unit may determine the priority channel so as not to be overlapped between the neighboring base station devices. With this scheme, even when building up the system so that the plurality of communication channels used for the transmission to the mobile station is overlapped between the base station devices, the mobile station utilizes only the signals transmitted via the priority channel according to the necessity, whereby the interference of the signals between the neighboring base station devices can be prevented.

A mobile station device according to the present invention comprises: a measuring unit measuring a reception level of the pilot channel transmitted from the base station; an acquiring unit acquiring the channel information transmitted via the communication channel other than the pilot channel; and a determining unit determining at least one of the plurality of communication channels as the available communication channel based on the channel information acquired by the acquiring unit and the reception level measured by the measuring unit.

With this configuration, the mobile station device can use the information organized by adding the channel information about the priority channel and the other channels to the reception level of the pilot signal, as a criterion for determining the available communication channel.

To be specific, for example, the determining unit may calculate each of the reception levels corresponding to the respective communication channels based on the channel information acquired by the acquiring unit and the reception level measured by the measuring unit, and may determine, as an available communication channel, the communication channel corresponding to the reception level larger than a predetermined threshold value in the calculated reception levels.

According to this scheme, the reception level corresponding to each communication channel is calculated based on the reception level of the pilot signal. This is based on an assumption that the pilot channel has the reception level higher than those of other communication channels because the pilot channel is transmitted with the larger transmission power in average than other communication channels.

The reception level of the pilot channel serving as the basis fluctuates corresponding to the existing position of the mobile station device, and hence in the mobile station device existing in the position remote from the base station device becoming a communication partner device, a reception level becomes lower, as a result, the number of communication channels each having the reception level lower than the predetermined threshold value increases, while in the mobile station device existing in the position close to the base station device, the reception level becomes higher, as a result, the number of communication channels each having the reception level higher than the predetermined threshold value increases. The proper communication channel can be thereby selected in a way that determines the communication channel corresponding to the reception level larger than the predetermined threshold value as the available communication channel.

Moreover, the available communication channel can be determined corresponding to the position of the mobile station device even if each pilot channel is not allocated corresponding to each communication channel in order to determine the available communication channel in the mobile station device. By extension, the number of the pilot channels can be reduced, and hence the band of the communication channels can be effectively utilized.

Further, for example, the transmitting unit of the base station device according to the present invention may transmit channel information including identifying information for distinguishing between the priority channel and the other channels and a predetermined correction value.

In this case, the determining unit of the mobile station device according to the present invention may calculates each of the reception levels corresponding to the respective communication channels by use of the identifying information for distinguishing between the priority channel and the other channels that are included in the channel information acquired by the acquiring unit, a predetermined correction value and the reception level measured by the measuring unit.

With this operation, the mobile station device, on the occasion of calculating the reception level corresponding to each communication channel, sets the reception level of the pilot channel serving as the basis to the reception level corresponding to the priority channel, and can calculate the reception level of each of the other communication channels from the predetermined correction value.

Further, the mobile station device according the present invention may further comprise a transmitting unit generating downlink channel information on the thus-determined available communication channels and transmitting the downlink channel information to the base station.

With this configuration the base station device according to the present invention may further include a selecting unit selecting the communication channel corresponding to the downlink channel information transmitted from the mobile station in the plurality of communication channels as the communication channel used for transmitting data addressed to the mobile station.

With this configuration being taken, the base station device according to the present invention can recognize the communication channel available to each mobile station based on the downlink channel information sent from each mobile station.

For example, the base station device may recognize that the communication channel with the downlink channel information not being transmitted is not the channel available to the mobile station device.

Herein, the downlink channel information described above may also be, e.g., CQI (Channel Quality Indicator) information, information based on the other channel estimation values and identifying information for distinguishing the available communication channel.

Thus, according to the present invention, the mobile station device can distinguish the proper available communication channel corresponding to the existing position thereof by measuring the reception level of the pilot channel.

Owing to this effect, even when the plurality of same communication channels is allocated to the neighboring base station devices, the available communication channel causing none of the interference is determined in the mobile station device, and it is therefore possible to actualize the high frequency utilizing efficiency while keeping the high communication quality (QoS).

It should be noted that the present invention may also be a mobile communication system including the mobile station device and the base station device described above. Further, the present invention may also be a method by which a computer realizes any functions described above.

Still further, the present invention may also be a program and a circuit for realizing any functions described above. Yet further, the present invention may also be a storage medium stored with such a program that can be read by the computer.

According to the present invention, it is feasible to provide the wireless communication system, the mobile station device and the base station device, which actualize the fast mobile communications while improving the frequency utilizing efficiency.

DESCRIPTION OF EMBODIMENTS

A wireless communication system according to an embodiment of the present invention will hereinafter be described with reference to the drawings. A configuration in the following embodiment is an exemplification, and the present invention is not limited to the configuration in the embodiment.

Embodiment

Figure 1:
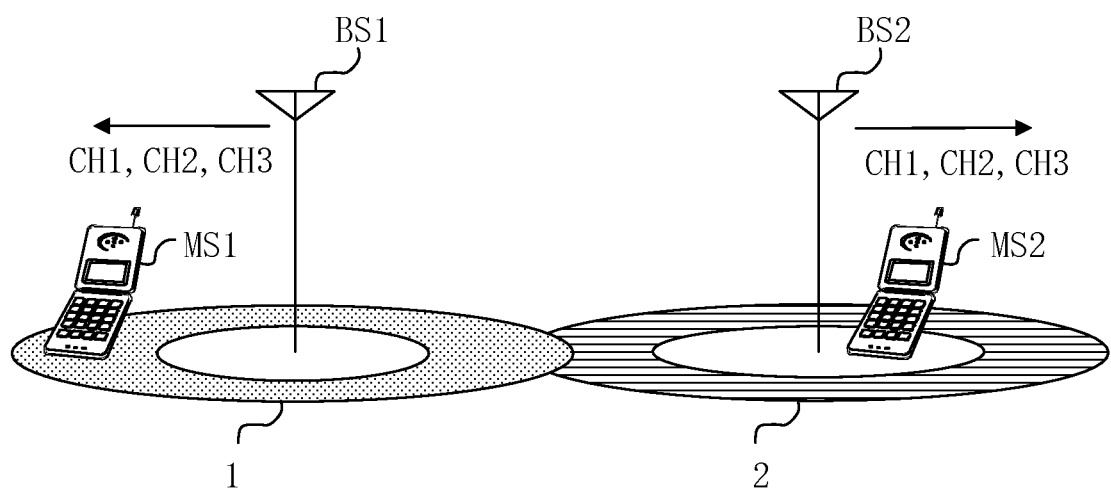
FIG. 1 is a view illustrating a system architecture of a wireless communication system in the embodiment.

The wireless communication system in the embodiment of the present invention will hereinafter be described with reference FIG. 1. FIG. 1 is a view illustrating a system architecture of the wireless communication system in the embodiment. The wireless communication system in the embodiment includes base station devices BS1 and BS2 (which will hereinafter be simply termed base stations), and mobile communication switching center device (unillustrated) which performs switching control of signals received by these base stations. The wireless communication system in the embodiment provides predetermined communication services to communication terminal devices MS1 and MS2 (which will hereinafter be also simply referred to as mobile stations) connected to the wireless communication system by conducting wireless communications with the base stations BS1 and BS2. Incidentally, it is assumed that the base station devices BS1 and BS2 neighbor to each other.

It is assumed that channels CH1, CH2 and CH3 for the communications are allocated respectively to the base station devices BS1 and BS2. Further, one channel of these communication channels is allocated as a priority channel to each of the base station devices BS1 and BS2 so that these priority channels are mutually different in the base station devices BS1 and BS2. An assumption in the embodiment is that the channel CH1 is allocated as the priority channel to the base station BS1, and the channel CH2 is allocated as the priority channel to the base station BS2. The priority channel connotes a communication channel that can be used preferentially by the base station. It should be noted that the present invention does not limit the number of the priority channels, and, for example, the priority channels of the base station BS2 may also be set to the channels CH2 and CH3.

The numerals 1 and 2 illustrated in FIG. 1 represent communication-enabled areas (cells) of the base stations BS1 and BS2. The following discussion will exemplify a case in which, as illustrated in FIG. 1, a mobile station MS1 exists in a position remote from the base station, while a mobile station MS2 exists in a position close to the base station. Note that each of the base stations BS1 and BS2 has function units related to the present invention that will hereinafter be described, and each of the mobile stations MS1 and MS2 shall likewise have function units related to the present invention. The base station devices (BS1 and BS2) and the communication terminal devices (MS1 and MS2) will hereinafter be respectively explained.

[Base Station Device]

Figure 2:
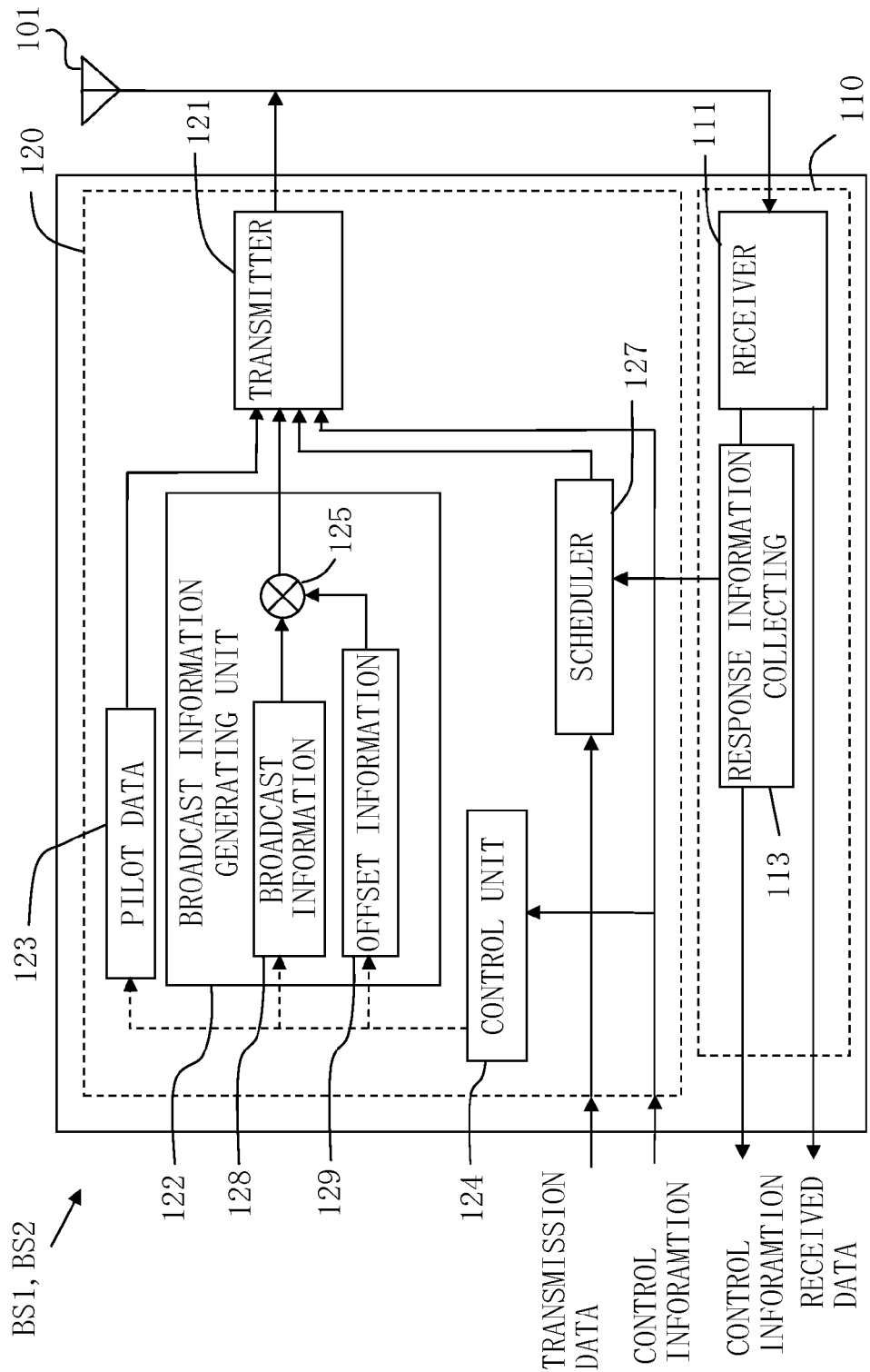
FIG. 2 is a block diagram illustrating an outline of a functional configuration of a base station device.

To start with, an outline of a functional configuration of each of the base station devices (BS1 and BS2) will be described with reference to FIG. 2. FIG. 2 is a block diagram illustrating the outline of the functional configuration of the base station device. As illustrated in FIG. 2, the base station device is constructed roughly of an antenna 101, a transmitting unit 120 and a receiving unit 110.

The transmitting unit 120 receives should-be-transmitted data (transmission data) and control information from other function units (unillustrated), and transmits these items of data by way of radio signals from the antenna 101 via the communication channel allocated to each base station. Further, the receiving unit 110 receives the signals received by the antenna 101, then demodulates/decodes these signals into the control information and the reception data, and sends the acquired data to other function units (unillustrated).

These individual function units may respectively be realized by hardware circuits and may also be realized in such a way that a CPU (Central Processing Unit) gets loaded with a control program stored in a memory and executes the control program. Incidentally, FIG. 2 illustrates only the function units related to the present invention.

<Receiving Unit>

The receiving unit 110 has a receiver 111, a response information collecting unit 113, etc. The receiver 111 effects processes of analog/digital converting, demodulating and decoding the radio signals received by the antenna 101, thereby acquiring the control information and the reception data (user data). The receiving unit 110 transfers the thus-acquired control information to the response information collecting unit 113.

The control information contains downlink (toward the mobile station from the base station) channel information generated by the mobile station. An assumption in the embodiment is that CQI (Channel Quality Indicator) information is used as the channel information. It is to be noted that the embodiment does not limit a type of the channel information. Further, the CQI information is generated with respect to each communication channel for the reception signals in the mobile station and is transmitted as information associated with each communication channel to the base station. A technique of generating the CQI information will be described later on.

The response information collecting unit 113 acquires the CQI information out of the control information transferred from receiver 111. The response information collecting unit 113 transfers the CQI information associated with each communication channel respectively to a scheduler 127 of the transmitting unit 120.

<Transmitting Unit>

The transmitting unit 120 includes a transmitter 121, a pilot data generating unit 123, a broadcast information generating unit 122, a control unit 124, the scheduler 127, etc.

The transmitter 121 includes a serial/parallel converting unit, a modulation unit, an Inverse Fourier Transform (IDFT (Inverse Discrete Fourier Transform) or IFFT (Inverse Fast Fourier Transform)) unit, a parallel/serial converting unit, a guard interval inserting unit, a digital/analog converting unit, a frequency converting unit, etc. Namely, the transmitter 121 generates, through these function units, OFDM signals into which to multiplex the control information transferred from other function units (unillustrated), the transmission data (user data) sent from the scheduler 127, pilot data sent from the pilot data generating unit 123 and broadcast information sent from the broadcast information generating unit 122. The thus-generated OFDM signals are finally high-frequency-converted and transmitted from the antenna 101.

Figure 3:
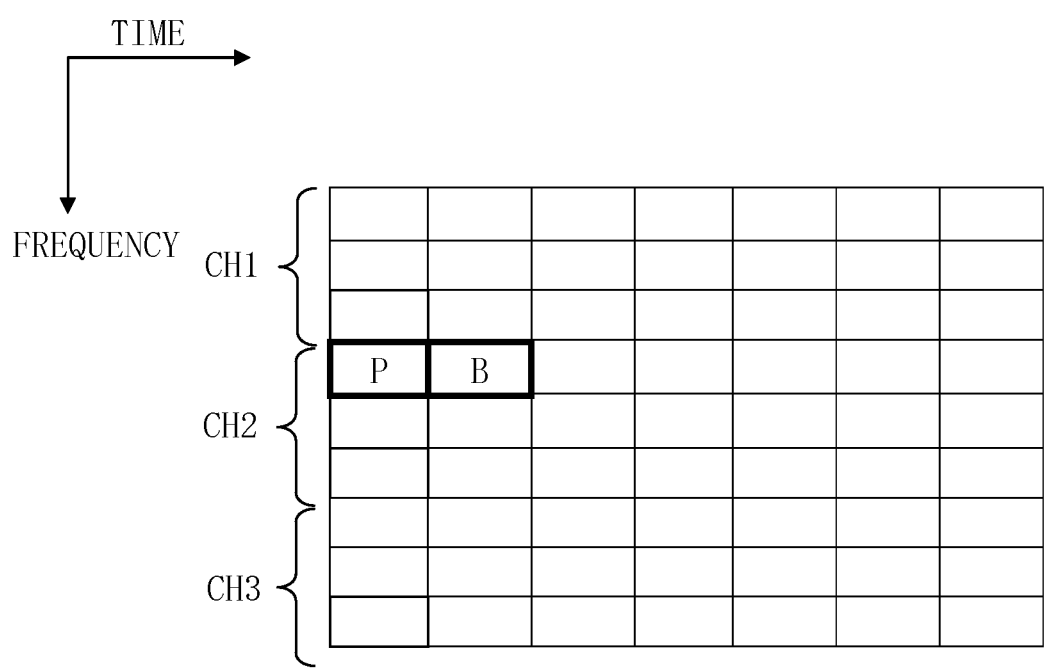
FIG. 3 is a diagram illustrating an example of a wireless frame format of an OFDM signal.

FIG. 3 illustrates an example of a wireless frame format of the OFDM signal generated by the transmitter 121. It is assumed that the transmitter 121 in the embodiment generates the OFDM signal having this type of wireless frame format. As illustrated in FIG. 3, the channels allocated to the self base station are the channels CH1, CH2 and CH3. Further, a pilot channel P is disposed corresponding to at least one of theses communication channels. In the example illustrated in FIG. 3, the pilot channel P is disposed at the communication channel CH2. Moreover, any one of these communication channels is set to a broadcast channel (BCCH (Broadcast Control Channel)) B. As a matter of course, the present invention does not restrict the allocation etc of these type of pilot channel P and broadcast channel B.

The pilot data generating unit 123 generates the predetermined pilot data (pilot signal) and transmits the pilot data to the transmitter 121. The pilot signal is transmitted generally at a fixed level of high transmission power.

The broadcast information generating unit 122 generates the broadcast information that should be transmitted via the broadcast channel. The broadcast information is generated in such a way that a synthesizing unit 125 adds offset information generated by an offset information generating unit 129 to the general type of broadcast information generated by a broadcast information generating subunit 128. The thus-generated broadcast information is sent to the transmitter 121.

Figure 4:
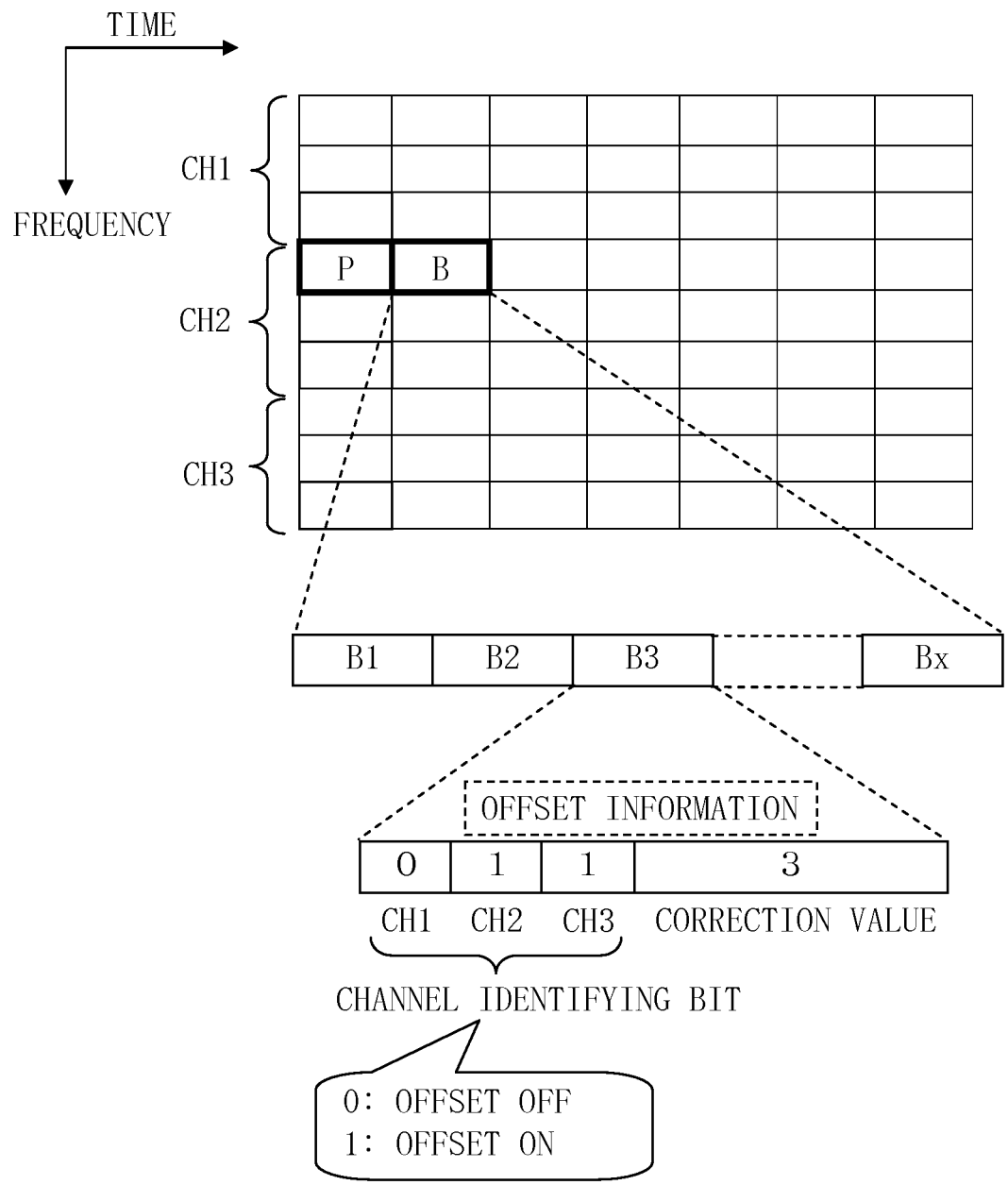
FIG. 4 is a diagram illustrating a wireless frame format in the case of transmitting offset information via a broadcast channel.

Items set in the offset information are identifying information for distinguishing the priority channel from other channels with respect to the communication channel allocated to each base station device, and a predetermined correction value utilized on the side of the mobile station. FIG. 4 is a diagram illustrating the wireless frame format in a case where the offset information is transmitted via the broadcast channel. As illustrated in FIG. 4, the broadcast information transmitted via the broadcast channel B contains the offset information (corresponding to B3). Then, channel identifying bits and the correction value are set in the offset information.

Each of the channel identifying bits represents the communication channel. The example in FIG. 4 illustrates an arrangement of a bit representing the communication channel CH1, a bit representing the communication channel CH2 and a bit representing the communication channel CH3 from the left side. When the bit is set to "1", the communication channel specified by the bit needs applying the correction value (offset on), i.e., the communication channel is the channel other than the priority channel. When the bit is set to "0", the communication channel specified by the bit does not need applying the correction value (offset off), i.e., the communication channel is just the priority channel.

In the example in FIG. 4, the 0-setting (offset off) of the bit showing the communication channel CH1 proves that the communication channel CH1 is the priority channel, while the 1-setting (offset on) of the bits showing the communication channels CH2 and CH3 proves that the communication channels CH2 and CH3 are the channels other than the priority channel. Note that a method of utilizing the predetermined correction value contained in the offset information will be described later on.

The control unit 124 controls the pilot data generating unit 123, the broadcast information generating subunit 128 and the offset information generating unit 129 so as to generate the predetermined signals that should be transmitted via the pilot channel and the broadcast channel and to transmit the generated signals to the transmitter 121.

The scheduler 127 determines which symbol of the channel and which channel, the communication channel CH1 or CH2 or CH3 allocated to the self base station, the transmission data (user data) sent from other function units (unillustrated) is distributed to. At this time, the scheduler 127 determines how the transmission data to each mobile station is distributed based on the CQI information of each mobile station, which is transferred from the response information collecting unit 113. The CQI information is transmitted in the way of being associated with each channel from the individual mobile station, and hence the scheduler 127 selects, based on the CQI information, the channel to which the transmission data to each mobile station should be allocated.

For example, if there is only the CQI information on the mobile station MS1 with respect to the channel CH1, the scheduler 127 distributes the transmission data to the mobile station MS1, to a predetermined symbol in the channel CH1. Further, if there is the CQI information on the mobile station MS2 with respect to all of the channels CH1, CH2 and CH3, the scheduler 127 distributes the transmission data to the mobile station MS2, to any one of the channels CH1, CH2 and CH3. It should be noted that the present invention does not limit the specific distribution determining method by the scheduler 127 as to which channel among the plurality of channels or which symbol in the channel the transmission data is distributed to.

[Communication Terminal Device]

Figure 5:
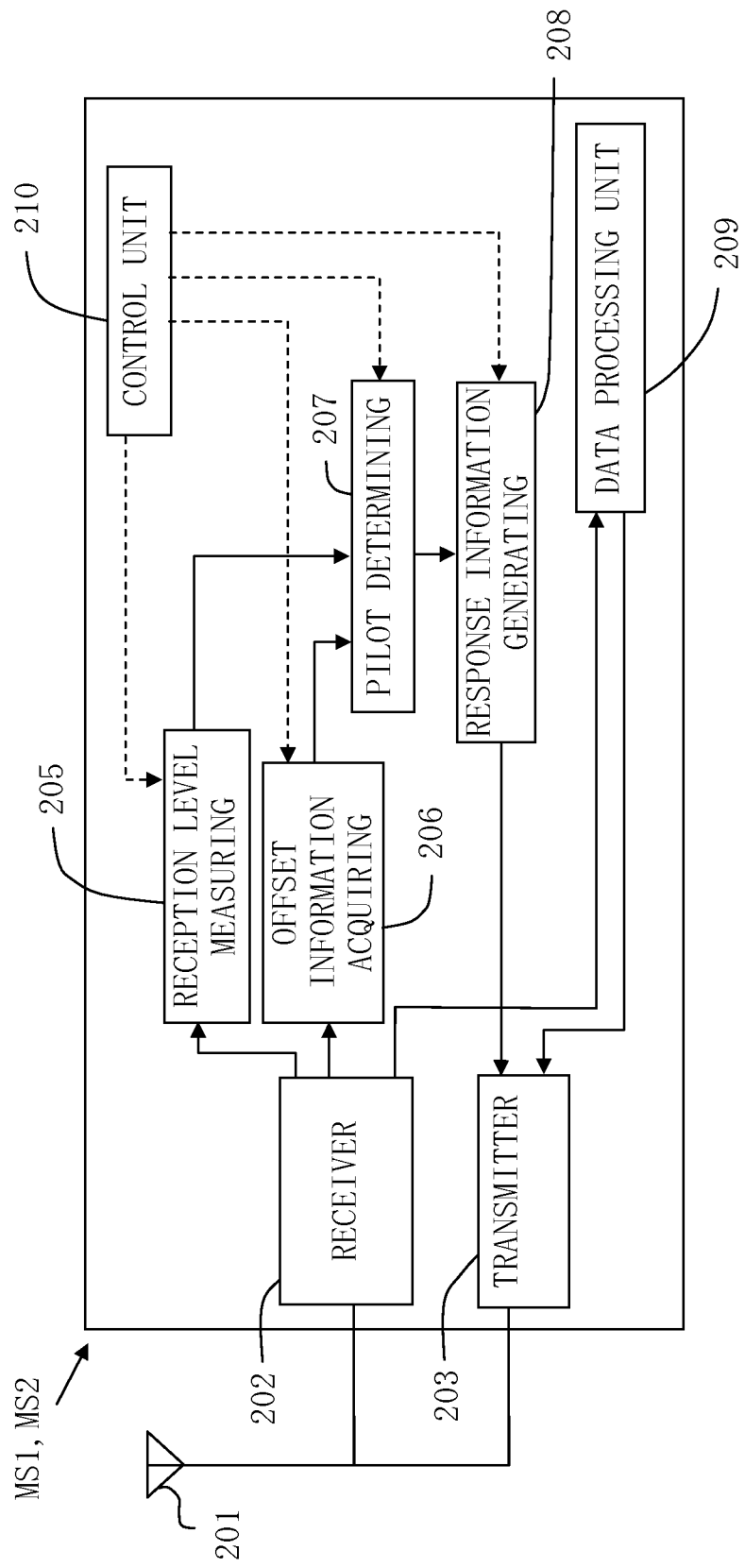
FIG. 5 is a block diagram illustrating an outline of a functional configuration of a communication terminal device.

Next, an outline of a functional configuration of each of the communication terminal devices (mobile stations MS1 and MS2) will be explained with reference to FIG. 5. FIG. 5 is a block diagram illustrating the outline of the functional configuration of the communication terminal device. As illustrated in FIG. 5, the mobile station includes an antenna 201, a receiver 202, a transmitter 203, a reception level measuring unit 205, an offset information acquiring unit 206, a pilot determining unit 207, a response information generating unit 208, a data processing unit 209 and a control unit 210. These individual function units may respectively be realized by the hardware circuits and may also be realized in such a way that the CPU (Central Processing Unit) loads the control program stored in the memory and executes the control program. Incidentally, FIG. 5 illustrates only the function units related to the present invention.

<Receiver>

The receiver 202 includes a frequency converting unit, an analog/digital converting unit, a guard interval removing unit, a serial/parallel converting unit, a Fourier transform (DFT (Discrete Fourier Transform)) or FFT (Fast Fourier Transform)) unit, a parallel/serial converting unit, a demodulation unit, a decoding unit, etc. The receiver 202, through these function units, demodulates and decodes the OFDM signals received by the antenna 201, and transmits the thus-acquired user data, control data, etc to the data processing unit 209.

Further, the receiver 202 sends the pilot signal in the signals obtained as a result of frequency-converting, digital-converting and Fourier-converting the received OFDM signals to the reception level measuring unit 205, and transmits the broadcast information to the offset information acquiring unit 206. Specifically, according to the example of the wireless frame format illustrated in FIGS. 3 and 4, the pilot signal received via the pilot channel P is transferred to the reception level measuring unit 205, while the broadcast information received via the broadcast channel B is transferred to the offset information acquiring unit 206.

<Data Processing Unit>

The data processing unit 209 processes the user data transmitted from the receiver 202. Further, the data processing unit 209 transmits the should-be-transmitted user data, control information, etc to the transmitter 203.

<Transmitter>

The transmitter 203 includes a serial/parallel converting unit, a modulation unit, an Inverse Fourier Transform (IDFT or IFFT) unit, a parallel/serial converting unit, a guard interval inserting unit, a digital/analog converting unit, a frequency converting unit, etc. The transmitter 203 generates, through these function units, OFDM signals into which to multiplex the user data and the control information sent from the data processing unit 209 and the CQI information sent from the response information generating unit 208. The thus-generated OFDM signals are finally high-frequency-converted and transmitted from the antenna 201.

<Reception Level Measuring Unit>

The reception level measuring unit 205 receives the pilot signal transferred from the receiver 202 and measures a reception level of the pilot signal. The wireless frame format utilized in the embodiment is that as illustrated in FIGS. 3 and 4, the pilot channel P is disposed corresponding to the single communication channel CH2 among the communication channels CH1, CH2 and CH3 allocated to the base stations BS1 and BS2. With this arrangement, the reception level measuring unit 205 measures the reception level of the pilot signal corresponding to the communication channel CH2. The reception level measuring unit 205 transmits the measured reception level of the pilot signal to the pilot determining unit 207.

<Offset Information Acquiring Unit>

The offset information acquiring unit 206 receives the broadcast information transferred from the receiver 202, and extracts the offset information described above out of the broadcast information. The items set in the offset information are, as described above, the identifying information for distinguishing the priority channel from other channels with respect to the plurality of received communication channels, and the predetermined correction value utilized on the side of the mobile station (see FIG. 4). The offset information acquiring unit 206 transmits the extracted offset information to the pilot determining unit 207.

<Pilot Determining Unit>

The pilot determining unit 207 receives the reception level of the pilot signal that is sent from the reception level measuring unit 205 and the offset information sent from the offset information acquiring unit 206, and determines which communication channel should be utilized for the self mobile station in the plurality of received communication channels.

On the occasion of making this determination, the pilot determining unit 207 at first calculates the reception level corresponding to each of the plurality of received communication channels in the way shown below.

The priority channel in the plurality of received communication channels is identified based on the identifying information contained in the offset information. To be specific, the communication channel specified by the channel identifying bit set as "offset off (0)" is identified with the priority channel. For example, the mobile station MS1 receiving the offset information transmitted from the base station BS1, because of "0" being set in the channel identifying bit specifying the communication channel CH1, identifies the communication channel CH1 with the priority channel, and the mobile station MS2 receiving the offset information transmitted from the base station BS2, because of "0" being set in the channel identifying bit specifying the communication channel CH2, identifies the communication channel CH2 with the priority channel.

Then, the pilot determining unit 207 allocates the reception level of the pilot signal that is transmitted from the reception level measuring unit 205 as the reception level corresponding to the communication channel identified with the priority channel. This process is based on a presumption that the pilot channel has the reception level higher than those of other communication channels because the pilot channel is transmitted with the larger transmission power in average than other communication channels.

The pilot determining unit 207 calculates a value of the reception level corresponding to the communication channel distinguished from the priority channel by subtracting the predetermined correction value contained in the offset information from the reception level of the pilot signal. For example, supposing that the predetermined correction value is "3" and the reception level of the pilot signal is "10", the reception level corresponding to each of the communication channels other than the priority channel is calculated at "7".

Finally, the pilot determining unit 207 compares the reception level of each communication channel with a predetermined threshold value. The pilot determining unit 207 determines from this comparison that the communication channel having the reception level higher than the predetermined threshold value should be used. The reception level of each of the communication channels thus determined to be available is sent to the response information generating unit 208. Note that the predetermined threshold value may be stored beforehand in a memory etc and may also be set to a value adjustable under the control of the control unit 210. Further, the base station may also notify of the predetermined threshold value separately.

<Response Information Generating Unit>

The response information generating unit 208 generates the CQI information of each communication channel determined available based on each reception level corresponding to the individual communication channel, which is transferred from the pilot determining unit 207. For example, the response information generating unit 208 retains a CQI information table in which the reception levels are associated with the respective pieces of CQI information, and may generate the CQI information of each communication channel determined available by referring to the CQI information table. The generated CQI information is sent to the transmitter 203.

<Control Unit 210>

The control unit 210 controls, the reception level measuring unit 205, the offset information acquiring unit 206, the pilot determining unit 207 and the response information generating unit 208 so that the available communication channel is determined and the CQI information associated with the available communication channel is generated. Note that the control unit 210 may previously retain the predetermined threshold value used in the pilot determining unit 207, and may also notify the pilot determining unit 207 of the predetermined threshold value. Moreover, the control unit 210 may retain the CQI information table utilized by the response information generating unit 208 and may also notify the response information generating unit 208 of the table-related information.

Operational Example

Figure 6:
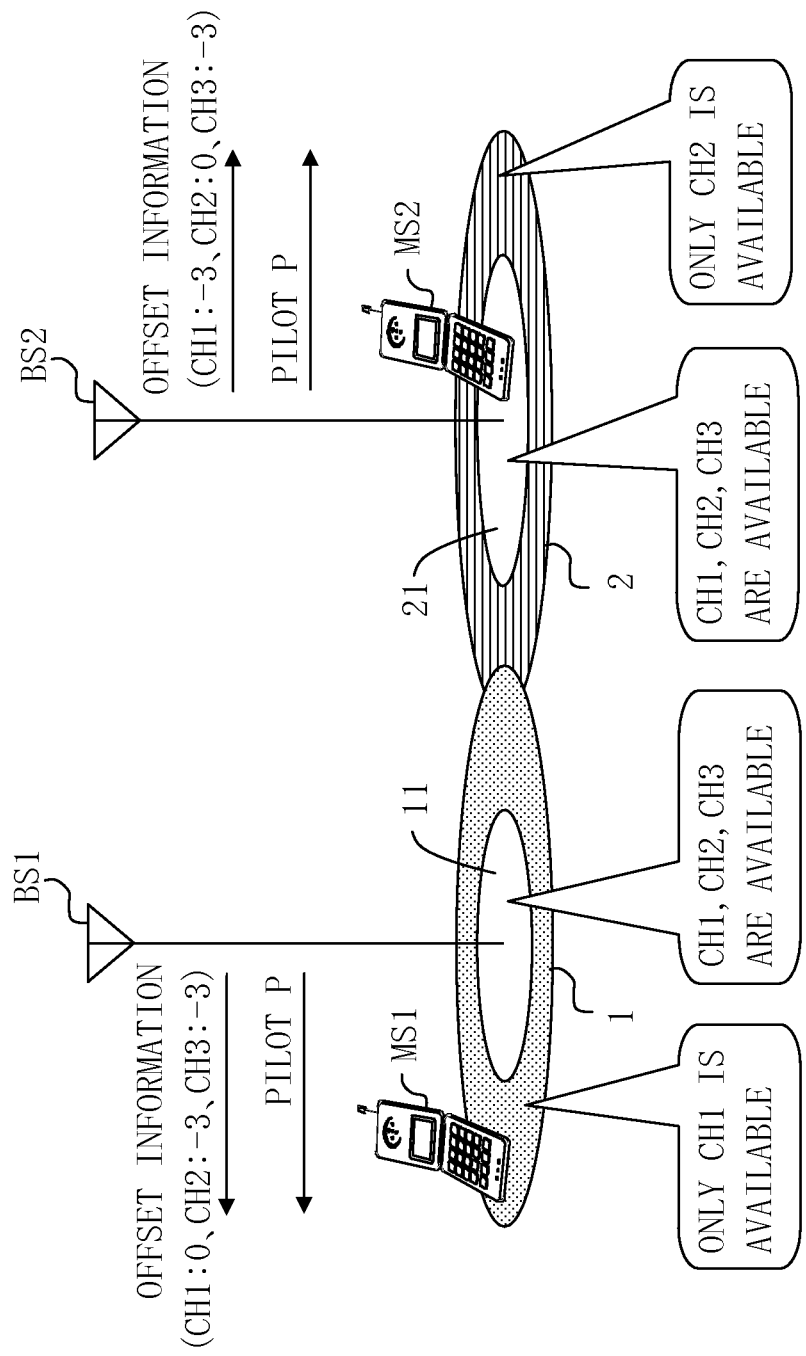
FIG. 6 is a conceptual diagram illustrating an example of a relationship between a pilot channel, offset information and an available channel of the mobile station in the wireless communication system in the embodiment.

Next, an operational example of the wireless communication system in the embodiment will be explained with reference to FIG. 6. FIG. 6 is a view illustrating a conceptual example of a relationship between the pilot channel and the offset information in the wireless communication system according to the embodiment and the available channel of the mobile terminal. As illustrated in FIG. 6, the base stations BS1 and BS2 transmit the pilot signals via the pilot channel P, the base station BS1 transmits the offset information in which to set the identifying information for distinguishing the priority channel CH1 from other channels CH2 and CH3 and the predetermined correction value (3), and the base station BS2 transmits the offset information in which to set the identifying information for distinguishing the priority channel CH2 from other channels CH1 and CH3 and the predetermined correction value (3). Then, the mobile station MS1 is located in the vicinity of a cell edge within a communication-enabled area 1 of the base station BS1, and the mobile station MS2 is located in the neighborhood of the base station within a communication-enabled area 2 of the base station BS2.

The mobile station MS1, when receiving the signals transmitted from the base station BS1, extracts the pilot signal and the broadcast information from the received signals (the receiver 202). The mobile station MS1 measures the reception level of the extracted pilot signal (the reception level measuring unit 205). Herein, it is assumed that the measured reception level of the pilot signal is "7".

Further, the mobile station MS1 acquires the offset information from the extracted broadcast information (the offset information acquiring unit 206). At this time, the mobile station MS1 acquires the identifying information (offset off) specifying that the channel CH1 is the priority channel, the identifying information (offset on) specifying that other channels CH2 and CH3 are the channels other than the priority channel and the predetermined correction value (3) out of the offset information transmitted from the base station BS1.

The mobile station MS1 sets the reception level (7) of the pilot signal to the reception level corresponding to the communication channel CH1 defined as the priority channel and the reception level corresponding to other communication channels CH2 and CH3 to a value (4) given by subtracting the predetermined correction value (3) from the reception level of the pilot signal.

Communication channel CH1 (priority channel): reception level (7)
Communication channel CH2: reception level (4)
Communication channel CH3: reception level (4)

The mobile station MS1, when determining the reception level corresponding to each of the communication channels, compares the determined reception level with the predetermined threshold value. Herein, an assumption is that the predetermined threshold value is set to "5". The mobile station MS1 determines from this process that the communication channel having the reception level larger than the predetermined threshold value is the available communication channel (the pilot determining unit 207). Resultantly, the mobile station MS1 determines that the communication channel CH1 is the available communication channel.

The mobile station MS1 generates the CQI information about the available channel CH1 (the response information generating unit 208). The mobile station MS1 transmits, to the base station BS1, the CQI information together with a piece of information indicating that the CQI information belongs to the channel CH1.

The base station BS1 receiving the CQI information, because of the CQI information about only the channel CH1 being transmitted, determines that the transmission data to the mobile station MS1 should be transmitted via the channel CH1 (the scheduler 127).

On the other hand, the mobile station MS2 exists in a position closer to the base station than the mobile station MS1 and therefore assumes that the reception level of the pilot signal, which is measured by the reception level measuring unit 205, is "10".

The mobile station MS2 acquires, out of the offset information transmitted from the base station BS2, the identifying information (offset off) specifying that the channel CH2 is the priority channel, the identifying information (offset on) specifying that other channels CH1 and CH3 are the channels other than the priority channel and the predetermined correction value (3).

The mobile station MS2 sets the reception level (10) of the pilot signal to the reception level corresponding to the communication channel CH2 defined as the priority channel and the reception level corresponding to other communication channels CH1 and CH3 to a value (7) given by subtracting the predetermined correction value (3) from the reception level of the pilot signal.

Communication channel CH1 (priority channel): reception level (10)
Communication channel CH2: reception level (7)
Communication channel CH3: reception level (7)

The mobile station MS2, when assuming herein that the same predetermined threshold value as in the case of the mobile station MS1 is set to "5", determines that the communication channels CH1, CH2 and CH3 are available communication channels. The mobile station MS2 generates the CQI information about the available channels CH1, CH2 and CH3 and transmits the CQI information to the base station BS2.

The base station BS2 receiving the CQI information, because of the CQI information about the channels CH1, CH2 and CH3 being transmitted, determines that the transmission data to the mobile station MS2 should be transmitted via the channels CH1, CH2 and CH3 (the scheduler 127).

(Description of Flow of Operations)

Figure 7:
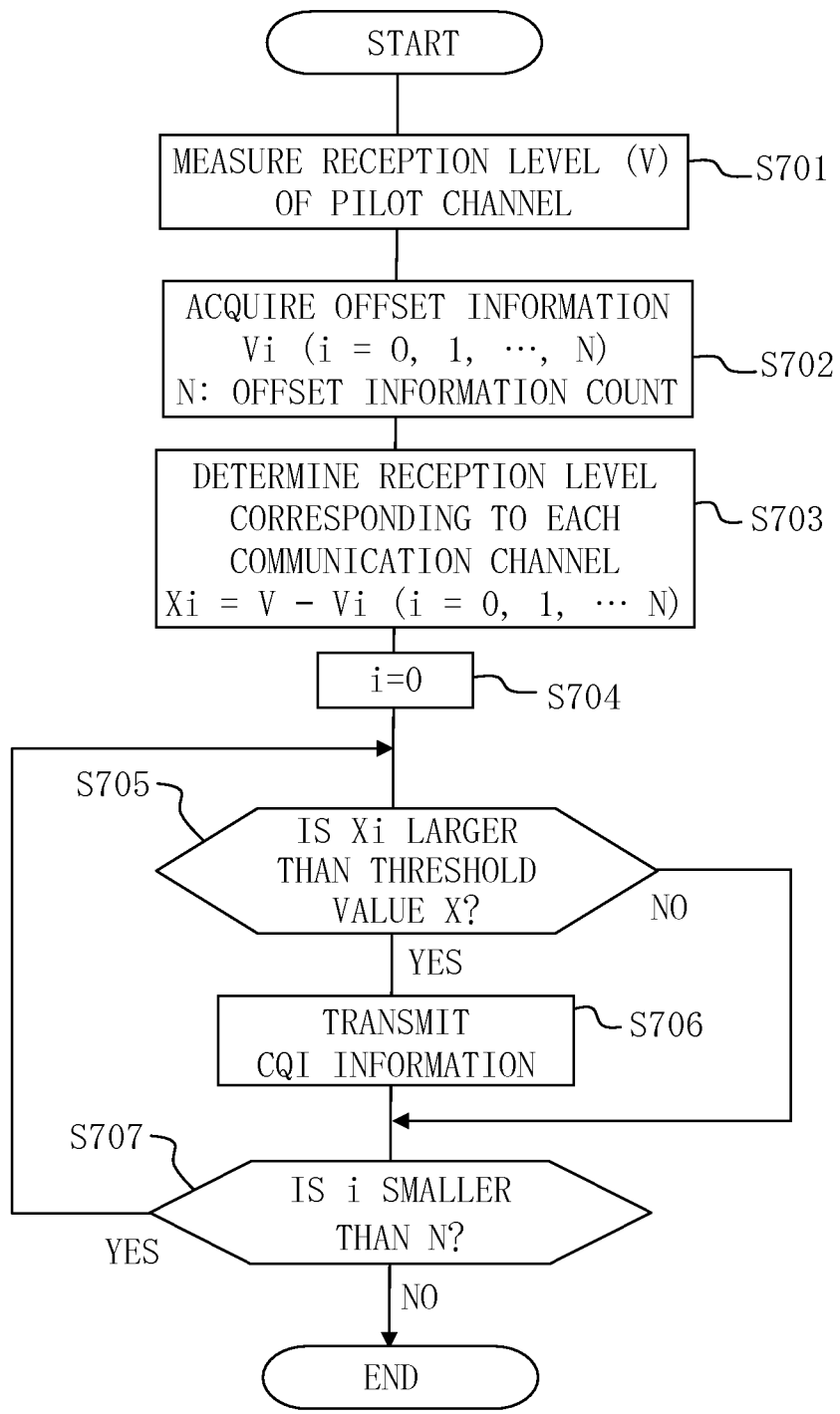
FIG. 7 is a flowchart illustrating an operation of the mobile station.

Next, an operation of each of the mobile stations MS1 and MS2 will be explained with reference to FIG. 7. FIG. 7 is a flowchart illustrating the operation of the mobile station.

The mobile station measures, with respect to the signals from the base station, the reception level (V) of the pilot channel (S701). Further, the mobile station acquires the offset information (Vi) from the broadcast information contained in the signals (S702). The symbol Vi shown herein denotes a predetermined correction value about each communication channel, which is contained in the offset information. The symbol Vi about the priority channel is "0", and the symbol Vi about other channels is set in the predetermined correction value. The symbol shows each communication channel and represents an offset information count N, i.e., a communication channel count.

The mobile station determines, based on the measured reception level (V) of the pilot channel and the predetermined correction value (Vi) concerning each communication channel, the reception level (Xi=V−Vi) corresponding to each communication channel (S703).

The mobile station compares the determined reception level corresponding to each communication channel with a predetermined threshold value (X) (S705). The mobile station generates the CQI information associated with the communication channel of which the reception level is determined from the comparison to be larger than the predetermined threshold value (S705; YES), and notifies the base station of the CQI information (S706). While on the other hand, the mobile station, with respect to the communication channel of which the reception level is determined to be equal to or smaller than the predetermined threshold value (S705; NO), does not notify of the CQI information. The mobile station repeats the comparing process (S705) and the CQI information transmitting process (S706) by the communication channel count (S704 through S707).

Operation and Effect in Embodiment

An operation and an effect of the wireless communication system according to the embodiment discussed above will hereinafter be described. In the wireless communication system according to the embodiment, the plurality of same communication channels is allocated to the neighboring base station devices, and at least one channel is allocated as the priority channel so as not to be overlapped in the respective neighboring base station devices.

The respective base station devices perform the wireless communications with the mobile stations by use of the plurality of communication channels allocated thereto and the pilot channel corresponding to at least one of these communication channels. Each of the base station devices transmits the broadcast information including the offset information in which to set the identifying information for distinguishing the priority channel allocated to the self-device from other channels and the predetermined correction value.

With this scheme, in the mobile station device receiving the pilot signal and the broadcast information that are transmitted from the base station device, the communication channel available in the self mobile station device in the plurality of communication channels utilized by the base station device is determined based on these items of information. To be specific, the reception level of the pilot signal is measured, and the reception level associated with each communication channel is determined based on the measured reception level and the offset information included in the broadcast information. Finally, the communication channel having the reception level larger than the predetermined threshold value is determined as the available communication channel.

The mobile station device generates the CQI information of each communication channel determined as the available communication channel, and transmits the CQI information to the base station device.

The base station device recognizes the communication channel available to each mobile station device based on the CQI information sent from each mobile station device. For example, the communication channel with the CQI information not being transmitted is recognized not to be the channel available to the mobile station device.

Thus, according to the wireless communication system in the embodiment, the mobile station device can determine the proper available communication channel corresponding to the existing location thereof simply by measuring the reception level of the pilot signal disposed corresponding to at least one of the plurality of communication channels.

With this scheme, even when the plurality of same communication channels is allocated to the neighboring base station devices, the mobile station device determines the available channel so as not to cause interference, and hence the high frequency utility efficiency can be actualized in a way that keeps a high communication quality.

Moreover, there is no necessity for disposing the pilot channel so as to correspond to all of the plural communication channels for the transmission from the base station, and it is therefore feasible to use the communication channels effectively for the data communications.

Modified Example

The wireless communication system in the embodiment discussed above utilizes the OFDM system as the wireless communication system between the base station and the mobile station, however, a TDMA (Time Division Multiple Access) system, a CDMA method, a W-CDMA system, etc may also be utilized. In this case, it may be sufficient that each of the mobile stations MS1 and MS2 builds up the receiver 202 and the transmitter 203 which support these communication systems, and each of the base stations BS1 and BS2 configures the transmitter 121 and the receiver 111 which support the communication systems.

Moreover, in the wireless communication system according to the embodiment discussed above, the offset information transmitted from the base station includes the setting of the identifying information for distinguishing the priority channel from other channels and the predetermined correction value, however, the correction value about each communication channel may also be individually set.

Further, in the wireless communication system according to the embodiment discussed above, the pilot channel is disposed corresponding to the single communication channel in the plurality of communication channels allocated to the base station, however, a plurality of pilot channels may also be disposed. In this case, the mobile station may determine which pilot channel the reception level should be measured about.

What is claimed is:

1. A base station device performing wireless communications with a mobile station by use of a plurality of communication channels and a pilot channel corresponding to at least one of the plurality of communication channels, the base station device comprising:
    a transmitting unit to set at least one of the plurality of communication channels as a priority channel to be used preferentially in the wireless communications by the base station and to transmit identifying information for distinguishing between the priority channel and the other channels and a predetermined correction value which is to be subtracted from reception level corresponding to the other channels in the mobile station so as to calculate reception levels corresponding to the other channels in the mobile station, to the mobile station by use of the communication channel other than the pilot channel;
    a receiving unit to receive downlink channel information indicating at least one available communication channel as a downlink communication channel determined by the mobile station based on the reception level corresponding to the priority channel and the other channels in the mobile station and the predetermined correction value; and
    a selecting unit to select at least one communication channel as the downlink communication channel used for transmitting data addressed to the mobile station in the plurality of communication channels based on the downlink channel information from the mobile station.

2. The base station device according to claim 1, wherein the transmitting unit determines the priority channel so as not to be overlapped between the base station and neighboring base station.

3. The base station device according to claim 1, wherein the transmitting unit uses a broadcast channel as the communication channel other than the pilot channel.

4. A mobile station device performing wireless communications with a base station by use of a plurality of communication channels and a pilot channel corresponding to at least one of the plurality of communication channels, the mobile station device comprising:
    a measuring unit to measure a reception level of the pilot channel transmitted from the base station;
    an acquiring unit to acquire identifying information for distinguishing between a priority channel to be used preferentially in the wireless communications by the base station and the other channels, and a predetermined correction value transmitted via the communication channel other than the pilot channel from the base station;
    a determining unit to determine at least one of the plurality of communication channels as an available communication channel based on the identifying information and the predetermined correction value acquired by the acquiring unit and the reception level measured by the measuring unit by subtracting the predetermined correction value from the reception level corresponding to the other channels; and
    a transmitting unit to generate downlink channel information indicating at least one available communication channel as a downlink communication channel and to transmit the downlink channel information to the base station.

5. The mobile station device according to claim 4, wherein the determining unit determines, as the available communication channel, the communication channel corresponding to the reception level larger than a predetermined threshold value.

6. A mobile communication system comprising a mobile station and a base station, which perform wireless communications by use of a plurality of communication channels and a pilot channel corresponding to at least one of the plurality of communication channels, the base station including:
a transmitting unit to set at least one of the plurality of communication channels as a priority channel to be used preferentially in the wireless communications by the base station and
to transmit identifying information for distinguishing between the priority channel and the other channels and a predetermined correction value, to the mobile station by use of the communication channel other than the pilot channel, the mobile station including:
a measuring unit to measure a reception level of the pilot channel transmitted from the base station;
an acquiring unit to acquire the identifying information and the predetermined correction value which are transmitted via the communication channel other than the pilot channel from the base station; and
a determining unit to determine at least one of the plurality of communication channels as an available communication channel based on the identifying information and the predetermined correction value acquired by the acquiring unit and the reception level measured by the measuring unit, by subtracting the predetermined correction value from the reception level corresponding to the other channels, wherein the mobile station includes:
a transmitting unit to transmit downlink channel information indicating at least one available communication channel as a downlink communication channel to the base station, and the base station includes:
a receiving unit to receive the downlink channel information from the mobile station and
a selecting unit to select at least one communication channel as the downlink communication channel used for transmitting data addressed to the mobile station in the plurality of communication channels based on the downlink channel information from the mobile station.

7. The mobile communication system according to claim 6, wherein the determining unit of the mobile station determines, as the available communication channel, the communication channel corresponding to the reception level larger than a predetermined threshold value.

8. The mobile communication system according to claim 6, wherein the transmitting unit of the base station determines the priority channel so as not to be overlapped between the base station and neighboring base station.

9. The mobile communication system according to claim 6, wherein the transmitting unit of the base station uses a broadcast channel as the communication channel other than the pilot channel.

* * * * *